US009332107B1

(12) United States Patent  
Persson et al.

(10) Patent No.: US 9,332,107 B1  
(45) Date of Patent: May 3, 2016

(54) HANDSET APPLICATION INTERRUPTION AVOIDANCE

(75) Inventors: Carl J. Persson, Olathe, KS (US); Sarah A. Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2484 days.

(21) Appl. No.: 11/948,641

(22) Filed: Nov. 30, 2007

(51) Int. Cl.
*H04M 1/725* (2006.01)
*H04M 11/00* (2006.01)

(52) U.S. Cl.
CPC .............. *H04M 1/725* (2013.01); *H04M 11/00* (2013.01)

(58) Field of Classification Search
USPC ........................... 455/412.2, 412.1, 403, 406; 379/67.1–88.28
See application file for complete search history.

(56) References Cited

U.S. PATENT DOCUMENTS

| | | | |
|---|---|---|---|
| 6,574,470 B1 * | 6/2003 | Chow et al. .................. 455/417 |
| 6,577,712 B2 * | 6/2003 | Larsson et al. .............. 379/88.17 |
| 6,882,708 B1 * | 4/2005 | Bedingfield et al. ........ 379/88.18 |
| 7,133,503 B2 * | 11/2006 | Revisky et al. .............. 379/88.12 |
| 7,216,107 B2 * | 5/2007 | Adachi et al. .................. 705/50 |
| 7,394,784 B2 * | 7/2008 | Siikaniemi et al. ........... 370/329 |
| 8,060,063 B1 | 11/2011 | Wageman |
| 2003/0225832 A1 | 12/2003 | Ludwig |
| 2005/0064883 A1 | 3/2005 | Heck et al. |
| 2006/0276180 A1 * | 12/2006 | Henry, Jr. .................. 455/412.2 |
| 2007/0022201 A1 | 1/2007 | Aaby et al. |
| 2007/0066324 A1 * | 3/2007 | Ko et al. .................... 455/461 |
| 2007/0121855 A1 * | 5/2007 | Tiliks et al. .............. 379/142.01 |
| 2007/0145135 A1 | 6/2007 | Jogand-Coulomb et al. |
| 2007/0293272 A1 * | 12/2007 | Salmon ........................ 455/566 |
| 2008/0085687 A1 * | 4/2008 | Brekke et al. ............... 455/187.1 |
| 2008/0159514 A1 * | 7/2008 | Phillips et al. ............. 379/215.01 |
| 2008/0280641 A1 * | 11/2008 | Kristensson et al. ........ 455/556.1 |
| 2009/0037540 A1 * | 2/2009 | Cai et al. ...................... 709/206 |
| 2009/0111433 A1 | 4/2009 | Muhonen et al. |

OTHER PUBLICATIONS

Wageman, Anthony J., Patent Application entitled "Presenting Messages on a Mobile Device that is Currently Presenting Other Media Content," filed Sep. 7, 2007, U.S. Appl. No. 11/851,668.
"YouTube," Wikipedia, http://en.wikipedia.org/wiki/YouTube, Feb. 2, 2011, 1 page.
"YouTube," www.youtube.com, Feb. 2, 2011, 1 page.
Office Action dated Feb. 17, 2011, U.S. Appl. No. 11/851,668, filed Sep. 7, 2007.
Notice of Allowance dated Aug. 30, 2011, U.S. Appl. No. 11/851,668, filed Sep. 7, 2007.

* cited by examiner

*Primary Examiner* — Kent Chang
*Assistant Examiner* — Scott Au

(57) ABSTRACT

A wireless handset for avoiding application interruption is disclosed that comprises a processor, a first component, and a second component. The first component, when executed by the processor, supports an application interruption avoidance feature that promotes preventing an incoming voice call from interrupting an application and forwarding the voice call to a voice mail server. Optionally, the first component also supports alerting a user without interrupting the in-progress application with one of a voice mail notification and an incoming call notification. The second component, when executed by the processor, is configured to receive control inputs to activate the application interruption avoidance feature and to deactivate the application interruption avoidance feature to allow a new voice call to come to the handset. The second component is also configured to select incoming call indicators and to activate/deactivate an incoming call alert to allow/prevent display of the incoming call indicators on the handset.

6 Claims, 9 Drawing Sheets

FIG. 5
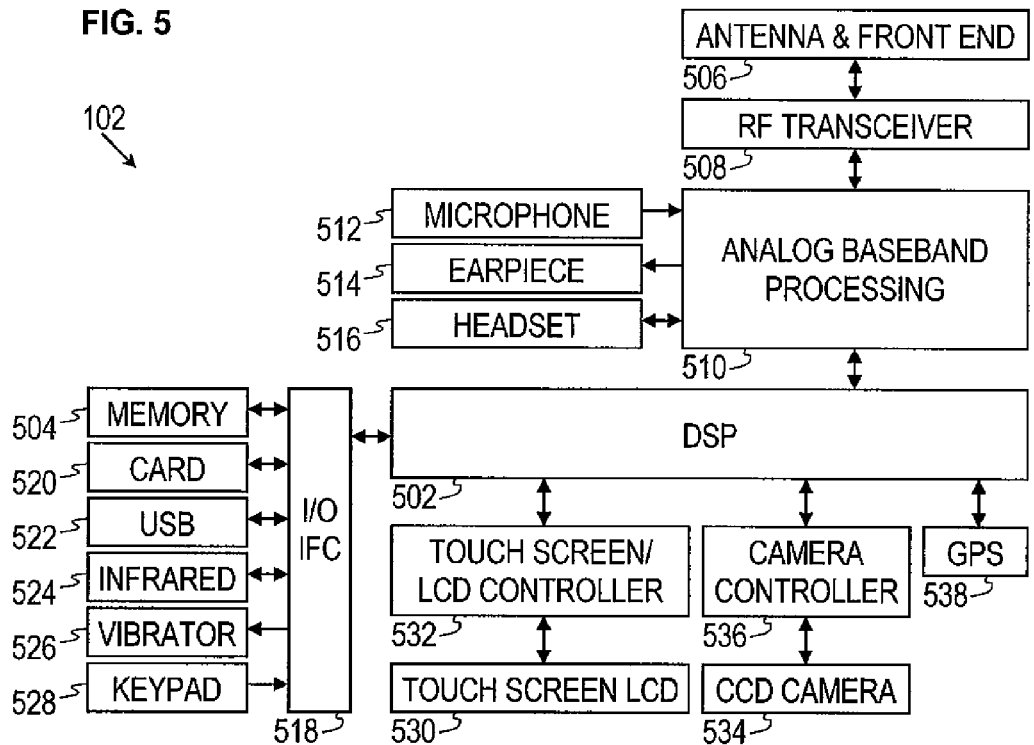
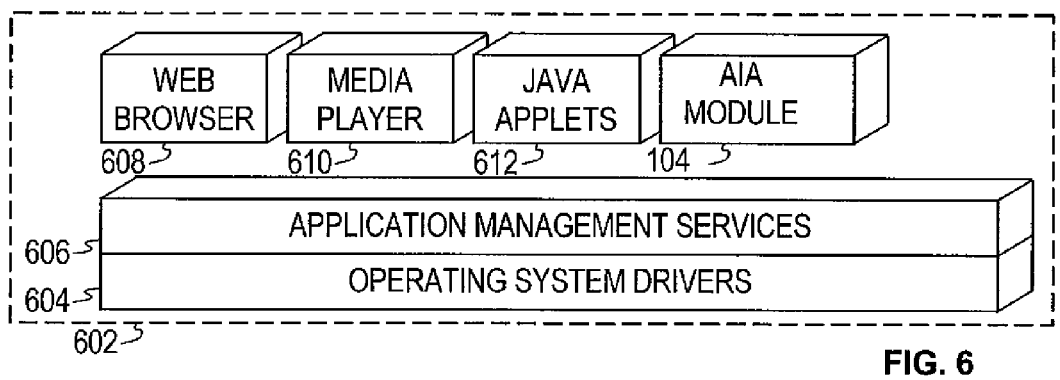
FIG. 6

HANDSET APPLICATION INTERRUPTION AVOIDANCE

CROSS-REFERENCE TO RELATED APPLICATIONS

This case contains subject matter that is related to U.S. patent application Ser. No. 11/851,668 filed Sep. 7, 2007 entitled, "Presenting Messages on a Mobile Device that is Currently Presenting Other Media Content," by Anthony J. Wagemanm, et al, which is hereby incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A wireless handset is a mobile communication device that may allow a user to initiate a call and receive a call. The handset may also support different types of applications. For example, the handset may be used as a platform for playing an online game, downloading a large file, and browsing a web page. Some handsets may not support both voice and applications at the same time. For example, a user may switch off the application in order to answer an incoming call. The wireless handset may have a limited bandwidth, in part because it communicates with a wireless network via an air interface which is a shared resource.

SUMMARY

In a first embodiment, a wireless handset for avoiding application interruption is provided that comprises a processor, a first component, and a second component. The first component, when executed by the processor, supports an application interruption avoidance feature that promotes preventing an incoming voice call from interrupting an application and forwarding the voice call to a voice mail server. Optionally, the first component also supports alerting a user without interrupting the in-progress application with one of a voice mail notification and an incoming call notification. The second component, when executed by the processor, is configured to receive control inputs to activate the application interruption avoidance feature and to deactivate the application interruption avoidance feature to allow a new voice call to come to the handset. The second component is also configured to select incoming call indicators and to activate/deactivate an incoming call alert to allow/prevent display of the incoming call indicators on the handset.

In a second embodiment, a method for avoiding handset application interruption is provided that comprises activating an application interruption avoidance service feature on a handset to prevent a voice call from interrupting an application, starting the application on the handset, and receiving a message from a coupled wireless network element to alert a user of an incoming call. The method also includes presenting at least an incoming call indicator on the handset and deactivating the application interruption avoidance service feature to allow a new voice call to come in.

In a third embodiment, a method for avoiding application interruption is provided that comprises provisioning an application interruption avoidance service feature for a handset into a first wireless network element that is configured to route an incoming call to the handset and into a second wireless network element that is configured to hold a plurality of subscriber profiles, including a subscriber profile for the handset and receiving an incoming call at the first wireless network element with a called party number that identifies the handset. The method also includes routing the incoming call to a voice mail server using an unconditional call forwarding service feature.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 illustrates an embodiment of a handset in a block diagram

FIG. 6 illustrates an embodiment of a handset software environment.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure presents a handset application interruption avoidance service feature that may prevent an incoming voice call from interrupting an in-progress application on the handset. This in-progress application may or may not have an active data session. A user or an application may activate and deactivate the application interruption avoidance service feature as needed. Instead of dropping the incoming call, the application interruption avoidance service feature may have the incoming call routed to voice mail to be retrieved later, based on adapting the unconditional call forwarding service feature. In addition, the handset may provide a visual indicator, an audible indicator, a textual indicator, or combination of the above to alert the user of the incoming voice call or to alert of the received voice mail without interrupting the in-progress application.

Figure 1:
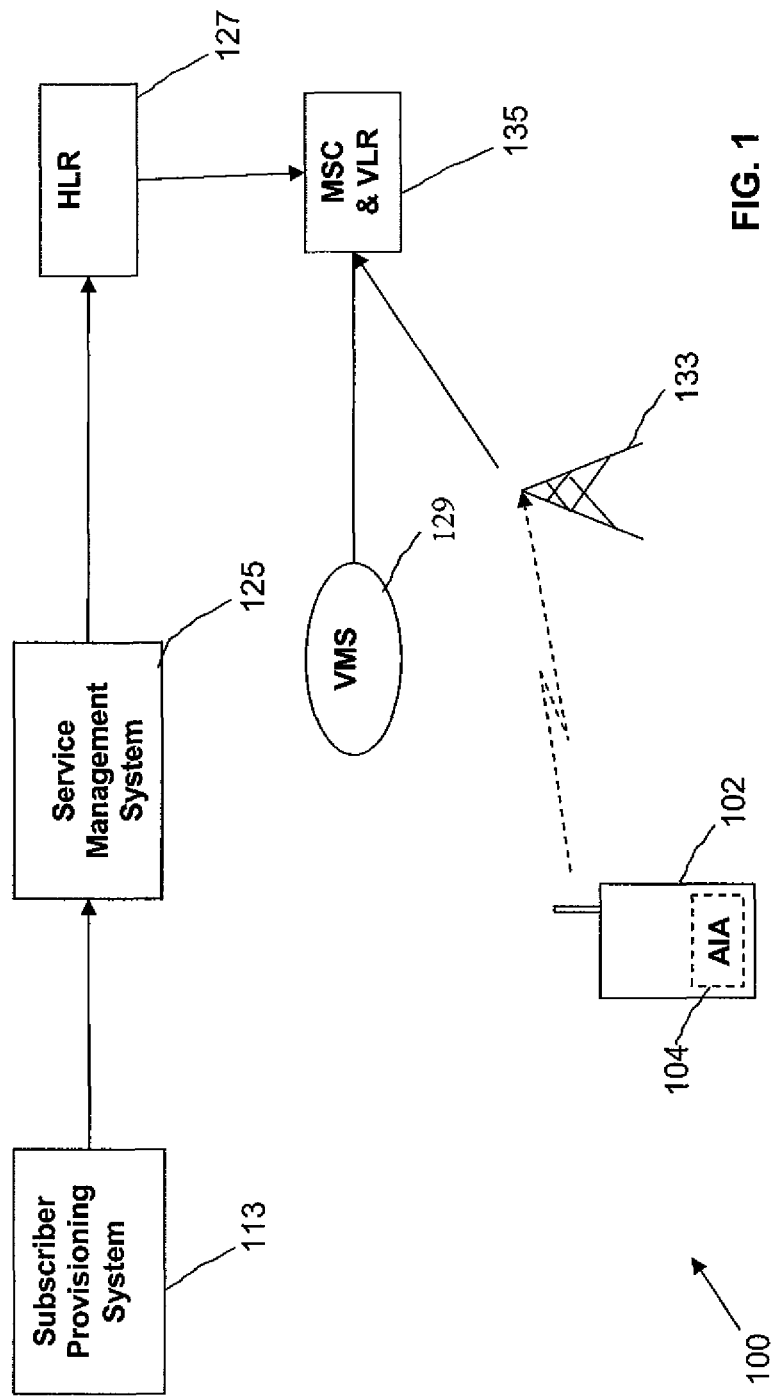
FIG. 1 illustrates a wireless communication system, according to some embodiments of the present disclosure.

FIG. 1 illustrates a wireless communication system 100, according to some embodiments of the present disclosure. The wireless communication system 100 may include a subscriber provisioning system 113, a service management system 125, and a wireless handset 102. The wireless communication system 100 may also include a wireless transmission tower 133, a mobile switching center (MSC) coupled with a visitor location register (VLR) 135, a voice mail server (VMS) 129, and a home location register (HLR) 127.

The subscriber provisioning system 113 may allow an operator to provision service for a new wireless subscriber by creating a subscriber profile. The subscriber profile may include the subscriber and the associated handset identification information and the service features that the subscriber has subscribed to and that may be activated on the handset. In some contexts herein, provisioning may mean configuring one or more communication network element or nodes to automatically respond to messages to provide communication services to a subscriber. In some embodiments, the provisioning may include creating and/or modifying entries in data tables that define, at least in part, the behavior of communications programs executing on the network nodes. The subscriber provisioning system 113 may also allow the operator to provision a service feature such as the application interruption avoidance into the wireless communication system or network 100. The subscriber provisioning system 113 may allow a service feature such as the application interruption avoidance service feature to be added to an existing subscriber profile, and may allow the subscriber to add service feature data, and to activate or deactivate the service feature. The subscriber provisioning system 113 may be a web-based service provisioning system, a stand-alone provisioning system or a command-line provisioning system with a bulk provisioning capability. In other embodiments, the subscriber provisioning system 113, which may be located at a backend office of a wireless carrier, may be an interactive and web-based system that allows the subscriber to provision his/her own service feature via a web interface.

The service management system (SMS) 125 may provide a number of functions and include a number of components. One function is managing service features and feature data. For example, to carry out the handset application interruption avoidance, a steering code, a sequence of digits that may be used to identify a network element such as a voice mail server and that may be longer than a 10-digit domestic number, may need to be provisioned into the subscriber profile associated with a handset. The service management system 125 may ensure that the correct service feature is provisioned into the appropriate network elements. The service management system 125 may also support a customer billing function that may keep track of network resources usage and service feature usage in order to generate a billing record for a subscriber. The service management system 125 may be located in a separate network element such as a service management node or may be co-located with another network element such as an mobile switching center.

The handset 102 may be a mobile communication device that supports both voice calls and applications. Some applications may have an active data session that depends upon exchanging data with a server or other device via the communications network 100. Other applications may not have an active data session but may still be interrupted and disturbed by incoming voice calls. The handset 102 may provide data applications such as email communications, online gaming, data downloading, music playback, wireless banking, and web page browsing, among others. The handset 102 may provide other applications that do not depend upon a data session, for example, gaming, scheduler, notes, contact list or address book, and others. The handset 102 may support both voice communications and applications, but may not support voice and applications at the same time. The handset 102 may include an application interruption avoidance (AIA) module 104 to support the application interruption avoidance service feature. The application interruption avoidance module 104 may allow the user to activate and deactivate the application interruption avoidance service feature by sending a message to network components such as the mobile switching center 135. Alternatively, an application may have built-in logic to activate the application interruption avoidance service feature, for example, by invoking methods or functions of an application program interface of the application interruption avoidance service feature. In some contexts, the user activating or deactivating and/or an application activating or deactivating the application interruption avoidance service feature may be referred to as selecting control inputs. The handset 102 may support multiple applications at the same time, and the multiple applications may independently activate the application interruption avoidance service feature.

When the application interruption avoidance service is activated, an incoming voice call is routed to the voice mail server 129, rather than the intended destination, the handset 102, to prevent the incoming call from interrupting an in-progress application on the handset 102. The application interruption avoidance module 104 may receive a notification of the incoming call to alert the user. The incoming call notification message may include information such as a call time and a calling party number, among others. The handset 102 may have an interface to allow the user to select one or more incoming call indicators. The incoming call indicators may include a textual indicator such as a textual message, an audible indicator such as a ring tone, and a visual indicator such as a flashing message icon. The handset 102 may allow the user to enable and disable the incoming call indicators. In an embodiment, the incoming call indicators are presented to the user during execution of the in-progress application in a non-interfering fashion. In an embodiment, the notification may be streamed across a top line or a bottom line of a display screen. The voice mail notification received by the handset 102 may trigger presenting the incoming call indicator to the user. In another case, however, when no voice mail is left by the calling party, the mobile switching center 135, the voice mail server 129, or another node in the network may generate and forward the incoming call notification message to the application interruption avoidance module 104.

The wireless transmission tower 133 may be part of a wireless access network. A wireless access network may include a number of base stations, also referred to as base station subsystems (BSS); a base station may include a number of base transceiver stations (BTS), and a BTS may have a wireless transmission tower 133. The wireless transmission tower 133 may facilitate the wireless communication between a user's equipment such as the handset 102 and the wireless network 100. The other user equipment may include devices such as mobile wireless local area network phones, computers with wireless Internet connectivity, and wireless personal digital assistants. The wireless network 100 may use any of the wireless communication technologies such as global system for mobile communication (GSM), code division multiple access (CDMA), wireless local area network (WLAN), and worldwide interoperability for microwave access (WiMAX), among others.

The mobile switching center/visitor location register 135, which may be located at a central office of a wireless service provider, is a wireless network element that provides a number of services. The services may include switching voice traffic from the wireless network to a wireline telephone network if the call is a mobile-to-landline call, or switching voice traffic to another mobile switching center within the wireless network 100 if the call is a mobile-to-mobile call. The mobile switching center 135 may provide telephony switching services and call controls between telephone and data networks and serve as a hub for a number of base stations, where the traffic from the base stations is aggregated. In addition, the mobile switching center 135 may provide a mobility management function for the subscribers. The mobility management function may include registering subscribers, authenticating and authorizing the subscribers for services and access to the network, maintaining information on the temporary location of the subscribers so they can receive calls, and originating voice calls. In some embodiments, the mobile switching center 135 may also provide service such as call routing based on the called number, and connection control service to establish trunks to carry the bearer traffic to another mobile switching center or to a telephony network.

According to some embodiments, the mobile switching center 135 may include or be coupled with a service feature module to provide service feature logic functions to support service features such as the 800 service, various call forwarding service features, the voicemail service, and the application interruption avoidance service feature. For the application interruption avoidance service feature, the mobile switching center 135 may receive an incoming call and recognize that the incoming call is to be terminated on the handset 102 that has the application interruption avoidance service feature activated. Instead of routing the incoming call to the handset 102, the mobile switching center 135 may invoke the application interruption avoidance service feature logic. The service feature logic may direct the mobile switching center 135 to route the incoming call to the voice mail server 129 and then send a notification message to the handset 102. In another embodiment, the notification message may be sent to the handset 102 later.

A visitor location register may be coupled with the mobile switching center 135. The visitor location register is essentially a database to store information on the handsets that are currently under the jurisdiction of the mobile switching center 135 which it serves. When a handset such as the handset 102 roams into the jurisdiction of the mobile switching center 135, the mobile switching center 135 may request the subscriber profile and mobility related information of the handset 102 from the home location register 127 of the handset 102 and keep the subscriber profile in the coupled visitor location register as long as the handset 102 remains under the jurisdiction of the mobile switching center 135. Once the mobile switching center 135 detects the handset 102 in its network, in addition to creating a new record in the coupled visitor location register, the mobile switching center 135 also updates the home location register 127 of the handset 102, apprising the home location register 127 of the new location of the handset 102. The information stored at the visitor location register about the handset 102 may include a current location area identity that identifies which base station under which the handset 102 is currently present.

The voice mail server 129 may provide voice mail service within the wireless network 100. The voice mail server 129 may communicate with the mobile switching center 135 via a communication protocol such as the session initiation protocol (SIP), the signaling system 7 (SS7) or other protocol. The voice mail server 129 may provide management functions to support storing and retrieval of voice calls.

The home location register 127 is a database that may contain information about subscribers in the wireless network 100 that is maintained by a service provider. The mobile switching center 135 may use the subscriber information supplied by the home location register 127 to authenticate and register the subscriber. In comparison to the visitor location register, the home location register 127 stores "permanent" subscriber information rather than temporary subscriber data, including the service profile, location information, and activity status of the handset 102. The subscriber profile associated with the handset 102 that is stored at the home location register 127 may contain the service features that are subscribed to by the subscriber. The service feature may include call forwarding, conference call, call waiting, and application interruption avoidance. The service data associated with each service feature may also be included in the subscriber profile. For example, the service feature data for a call forwarding service feature may include one or more call forward-to numbers. The service feature data for the application interruption avoidance service feature may include a steering code to identify the voice mail server 129. The service feature data may also include the service feature status such as activated or deactivated.

Figure 2A:
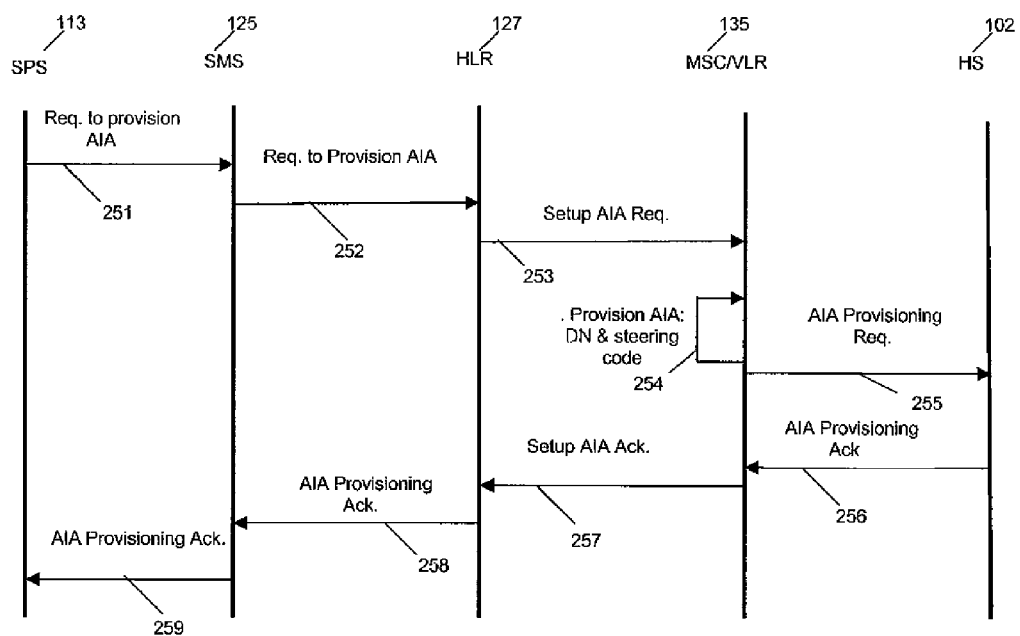
FIG. 2a illustrates a message flow chart for provisioning an application interruption avoidance service feature, according to some embodiments of the present disclosure.

FIG. 2a illustrates one embodiment of a message flow chart 200a for provisioning the application interruption avoidance service feature into the wireless network 100, according to some embodiments of the present disclosure. The message flow chart 200a may show one of several possible message sequences and is independent of a specific message protocol. A number of protocols including the session initiative protocol (SIP) may be used for the implementation.

The subscriber provisioning system 113 sends to the service management system 125 a request as the message 251 to provision the application interruption avoidance service feature into the wireless network 100. The request may include the handset's unique mobile terminal identification and the subscriber identification number, among others. The service management system 125 may have a service creation environment that supports the creation of the service feature logic and service feature data. A service feature logic may be an assembled software module that can be executed at the time the service feature is invoked. For example, the application interruption avoidance service feature logic may include the code to call an unconditional call forwarding service feature to forward a call to a voice mail server. The service feature data may include a steering code to setup a connection to the voice mail server as a destination for the unconditional call forwarding.

The service management system 125 forwards the request to the coupled home location register 127 as the message 252. The HRL 127 may update the subscriber profile associated with the handset 102 to include the application interruption avoidance service feature. The subscriber profile may contain a list of service features that the subscriber has subscribed to, the associated service feature data, and the status of the subscribed service features.

The home location register 127 sends a service feature provisioning request as the message 253 to the mobile switching center 135. In some embodiments, the mobile switching center 135 may carry out the service logic for the application interruption avoidance service feature. The mobile switching center 135 may provision the service logic and the service feature data into the proper service module coupled with the mobile switching center 135, shown as the message 254. The service data may include the steering code identifying the associated voice mail server. The service data may also include the destination number (DN) or the called party number. The mobile switching center 135 sends the provisioning message 255 to provision the application interruption avoidance service feature into the handset (HS) 102. The handset 102 needs to have the application interruption avoidance module 104 to support the service feature. In one embodiment, the application interruption avoidance module 104 is downloaded into the handset 102 when the service is subscribed to. In other embodiments, the service feature may be preloaded into the handset 102.

An acknowledgement as the messages 256 through 259 is sent back to report to the subscriber provisioning system 113 the status of the operation to provision the application interruption avoidance service feature into the wireless network 100. The provisioning of the application interruption avoidance service feature as shown in the message flow chart 200a may take place offline and before any use of the application interruption avoidance service feature.

Figure 2B:
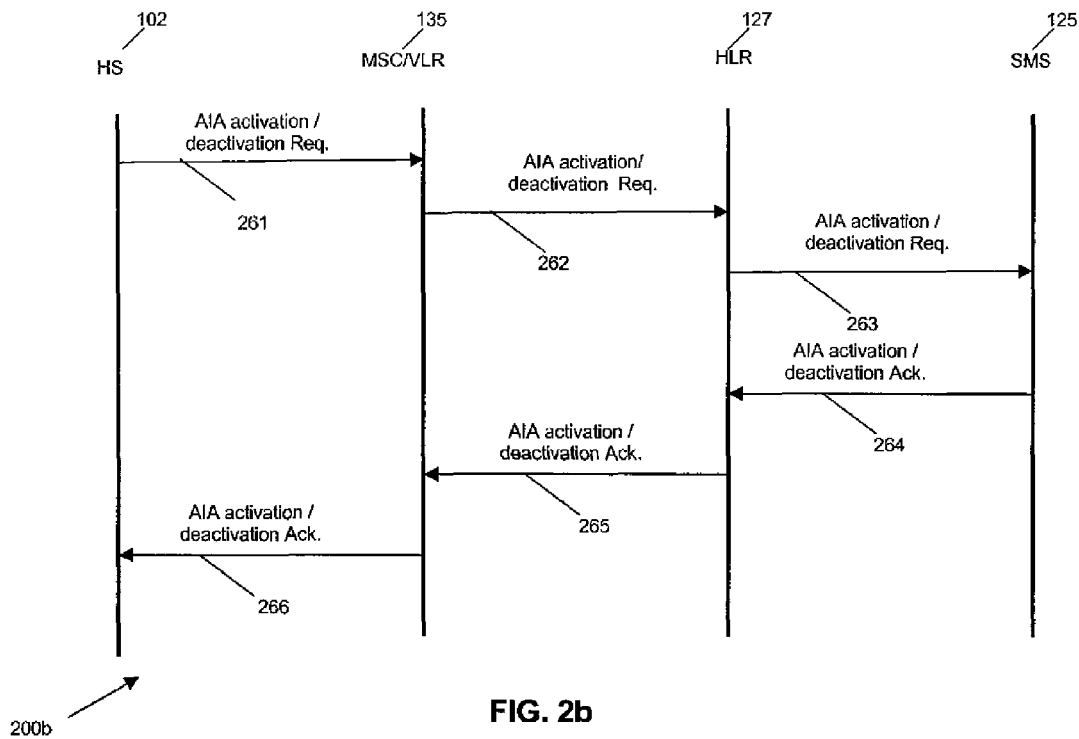
FIG. 2b illustrates a message flow chart for activating and deactivating the application interruption avoidance service feature, according to some embodiments of the present disclosure.

FIG. 2b illustrates a message flow chart 200b for activating and deactivating the application interruption avoidance service feature, according to some embodiments of the present disclosure. The message flow chart 200b is independent of any specific message protocol and may be implemented in one of a number of protocols, one of which may be the session initiative protocol (SIP).

The handset 102 initiates a request as the message 261 to activate or deactivate the application interruption avoidance service feature. In one embodiment, the handset 102 may send a message using a data call or a voice call to the mobile switching center/visitor location register 135. One application scenario may be that the user activates the application interruption avoidance service feature before starting an application such as an online game or a file downloading session to avoid any interruption of the application. The user may then deactivate the application interruption avoidance service feature to allow new voice calls to come to the handset 102 once the application session terminates. Depending on the implementation of the application interruption avoidance service feature, the mobile switching center/visitor location register 135 may perform different functions in response to receiving the request to activate or deactivate the application interruption avoidance service feature. In some embodiments, the mobile switching center 135 may have the subscriber profile of the handset 102 and may set the application interruption avoidance service feature status to active in the stored subscriber profile. In other embodiments, the home location register 127 may have control of the service feature status.

The request as the message 262 to activate or deactivate the application interruption avoidance service feature is passed from the mobile switching center/visitor location register 135 to the home location register 127. The home location register 127 may set the service feature status as active or inactive. When the handset 102 moves out of the area served by the mobile switching center 135 and into a different area, the active status of the service feature will be obtained by the new serving mobile switching center 135, so that the new serving mobile switching center 135 may invoke the application interruption avoidance service feature when a new voice call comes in. The request message is passed to the service management system 125 as the message 263. In some embodiments, the service management system 125 may keep track of the user activities such as activating and deactivating a service feature. A notification message is propagated back to the handset 102 as the messages 264 through 266 to report the status of the operation to activate or deactivate the application interruption avoidance service feature.

Figure 2C:
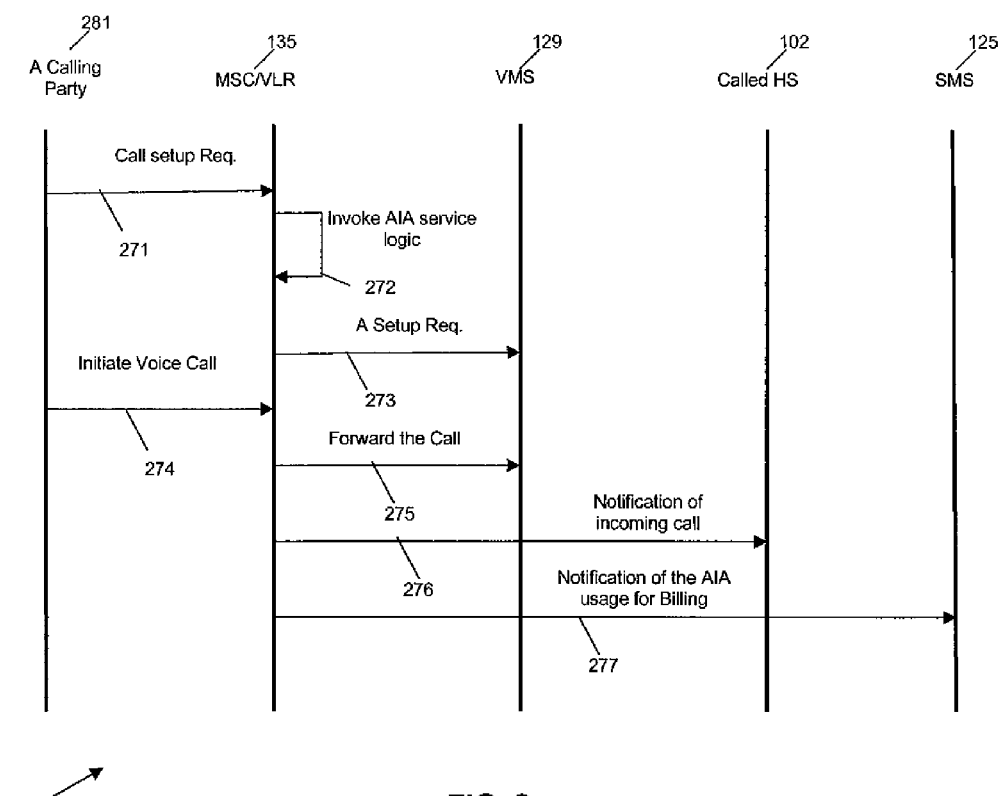
FIG. 2c illustrates a message flow chart for carrying out the application interruption avoidance service feature, according to some embodiments of the present disclosure.

FIG. 2c illustrates a message flow chart 200c for carrying out the application interruption avoidance service feature, according to some embodiments of the present disclosure. The message flow chart 200c may be implemented in one of a number of protocols. The prospect protocols may include the session initiative protocol (SIP), signaling system 7 (SS7), and primary rate interface (PRI), among others.

A calling party 281 originates a call by sending a call setup request as the message 271 to the mobile switching center 135. The calling party 281 may use a landline phone, another wireless handset, or a voice over Internet protocol (VoIP) phone. The mobile switching center 135, in deciding where to route the call based on the called destination number contained in the call setup message, recognizes that the destination handset 102 has the application interruption avoidance service feature activated. Then mobile switching center 135 may execute the service logic associated with the application interruption avoidance service feature shown as the message 272. The mobile switching center sends a call setup message 273 to the voice mail server 129 to establish a connection between the mobile switching center 135 and the voice mail server 129 for the incoming call.

Once the call setup is completed, the calling party 281 may start the voice call to the mobile switching center 135 as the message 274, and the mobile switching center 135 may then forward the call as the message 275 to the voice mail server 129 using an unconditional call forwarding service feature, rather than routing the call to the destination handset 102. In some embodiments, the mobile switching center 135, upon completion of establishing the connection to the voice mail server 129, sends a notification message 276 to the called handset 102 to alert the handset 102 of the incoming call. In response to receiving the alert message from the mobile switching center 135, the called handset 102 may alert the user of the incoming call, using a textual indicator, an audible indicator, visual indicator or a combination of the above. The mobile switching center 135 sends a notification message 277 to the service management system 125 so that the billing component of the service management system 125 may record the usage of the application interruption avoidance service feature for the billing purpose. The flow chart 200c shows one embodiment of carrying out the application interruption avoidance service feature at the handset 102 and the connected wireless network 100. Other embodiments may involve different network elements and have a different message sequence.

Figure 3A:
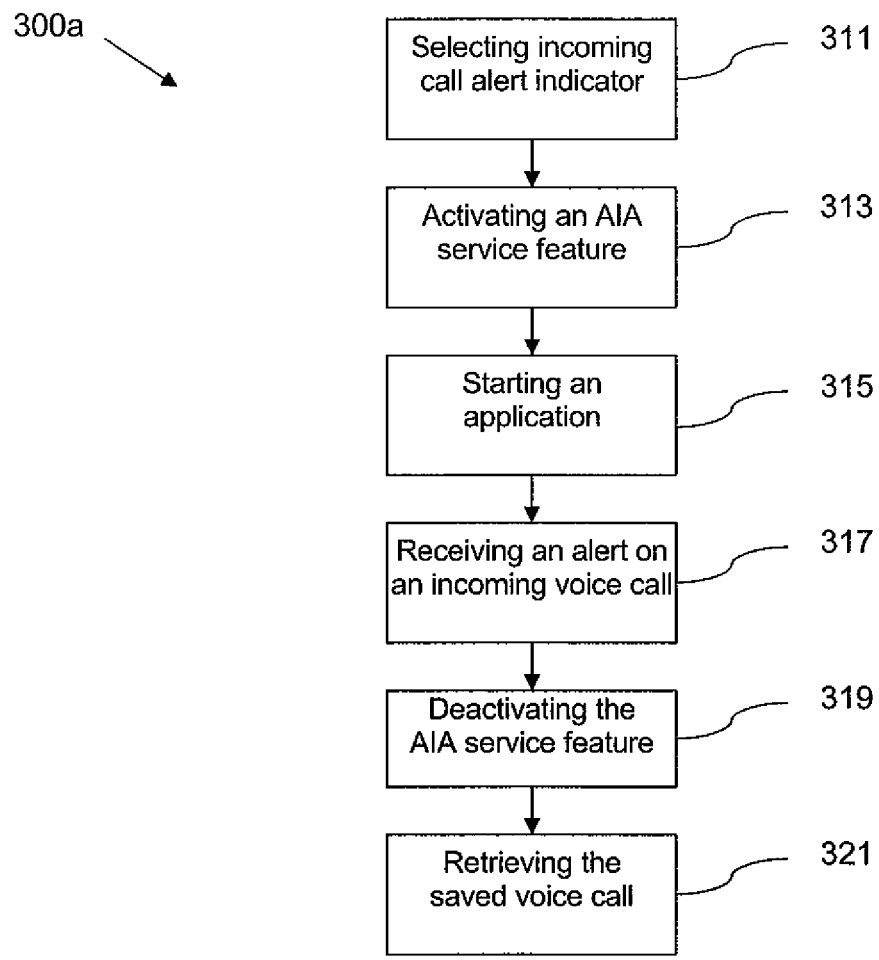
FIG. 3a illustrates a method for carrying out the application interruption avoidance service feature at a handset, according to some embodiments of the present disclosure.

FIG. 3a illustrates a method 300a for carrying out the application interruption avoidance service feature at the handset 102, according to some embodiments of the present disclosure. The method 300a may include selecting incoming call alert indicators, activating the application interruption avoidance service feature, and starting an application. The method 300a may also include receiving an incoming call alert message, deactivating the application interruption avoidance service feature, and retrieving the saved voice call. A different embodiment of the method 300a may have fewer or more components in a different sequence, depending on the need of a user.

Block 311 shows selecting an incoming call alert indicator at a handset such as handset 102. Selecting the incoming call alert indicator may include selecting one or more of the indicators to alert the user of an incoming voice call, so that the user is aware of the incoming call while the in-progress application is not disturbed. The indicators may include a textual indicator, an audible indicator, and a visual indicator. The textual indicator may be a message to be displayed on a handset to notify the user of the incoming voice call, and the message may include the calling party number or other information about the incoming call. The audible indicator may be a beep or a ring tone of the user's choice. An example of the visual indicator may be an icon that flashes a predefined number of seconds. The user may choose one or more of the indicators, and selecting the indicator may take place before the application session starts, during the application session or at any other time.

Block 313 shows activating the application interruption avoidance service feature. Activating the application interruption avoidance service feature may include selecting the application interruption avoidance service feature from a list of subscribed features that may by activated by the user from a handset interface and turning on the service feature by setting the status of the service feature to active. Activating the application interruption avoidance service feature may also include sending a message to the associated wireless network elements such as mobile switching center 135 and home location register 127 to set the service feature status to active in the subscriber profile. Activating the application interruption avoidance service feature is analogous to adding a call forwarding service feature and activating the newly added call forward-to number. Block 315 shows starting an application. Starting an application may include starting an application such as an online game, an offline game, a scheduling application, a contact list application, a download session, and a web page browsing session, among others. The application may be started at a time of the user's choice, independent of the activation and deactivation of the application interruption avoidance service feature.

Block 317 shows receiving a call alert message on the incoming voice call. Receiving the alert call message on the incoming call may include receiving a notification message from the wireless network element such as the mobile switching center 135 and displaying the selected incoming call indicator(s) on the handset to alert the user of the incoming call. The displayed incoming call indicator(s) may include a calling party number and other information that is contained in the call alert message.

Block 319 shows deactivating the application interruption avoidance service feature. Deactivating the application interruption avoidance service feature is similar to activating the service feature and may include setting the service feature status to inactive on the handset interface and sending a message to the associated wireless network element such as the mobile switching center 135 and the home location register 127 that in turn set the service feature status to inactive in the subscriber profile. This allows new calls intended for the handset to be routed to the handset 102.

Block 321 shows retrieving the saved call from the voice mail server 129. Retrieving the saved call may include displaying the incoming call indicators and retrieving the call or calls from the voice mail server 129. Once the application has terminated, the incoming call indicators may be displayed again to remind the user of the calls that were routed to the voice mail server 129 when the application interruption avoidance service feature was activated. Then the user may use the handset 102 to retrieve the saved call as part of normal handset operations.

Figure 3B:
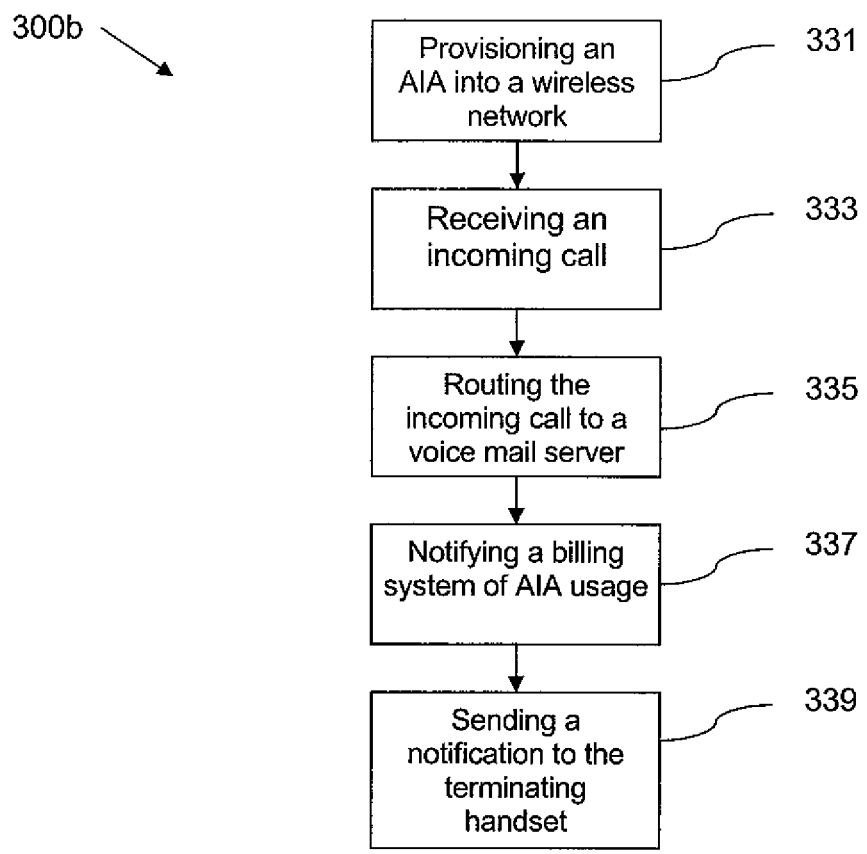
FIG. 3b illustrates a method for implementing the application interruption avoidance service feature at a wireless network, according to some embodiments of the present disclosure.

FIG. 3b illustrates a method 300b for carrying out the application interruption avoidance service feature at the wireless network 100, according to some embodiments of the present disclosure. The method 300b may include provisioning the application interruption avoidance service feature, receiving an incoming call, and routing the incoming call to the voice mail server 129. The method 300b may also include notifying a billing system of the usage of the application interruption avoidance service feature by the terminating handset and sending a notification to the terminating handset 102.

Block 331 shows provisioning the application interruption avoidance service feature. Provisioning the application interruption avoidance service feature may include loading the service feature logic and service feature data into the mobile switching center 135 and the home location register 127. Block 333 shows receiving the incoming call at the wireless network element mobile switching center 135. Receiving the incoming call may include receiving the incoming call from another network node or a calling party directly and recognizing the called party number at the mobile switching center 135. Recognizing the called party number may involve identifying the handset 102 associated with the called party number and recognizing that the handset 102 has the application interruption avoidance service feature activated.

Block 335 shows routing the incoming call to the voice mail server 129. Routing the incoming call may include setting up a connection to the voice mail server 129 and invoking the unconditional call forwarding feature to forward the call to the voice mail server 129 using the provisioned steering code. Block 337 shows notifying the billing component of the service management system 125 of the usage of the application interruption avoidance service feature by the handset 102. Notifying the billing system may include sending a protocol message to the billing component of the service management system 125. The protocol message may include the called party number, the originating party number, a feature code for the application interruption avoidance service feature, and a feature usage time, among others. The application interruption avoidance service feature may be a billable feature based on usage time or number of times of the usage.

Block 339 shows sending a notification to the handset 102 on the incoming call. Sending the notification may include sending a protocol message to alert the terminating handset 102 of the incoming call so that one or more incoming call indicators may be presented at the handset 102. The notification message may include a calling party number, a call time, and other information that may be of interest to the user.

Figure 4:
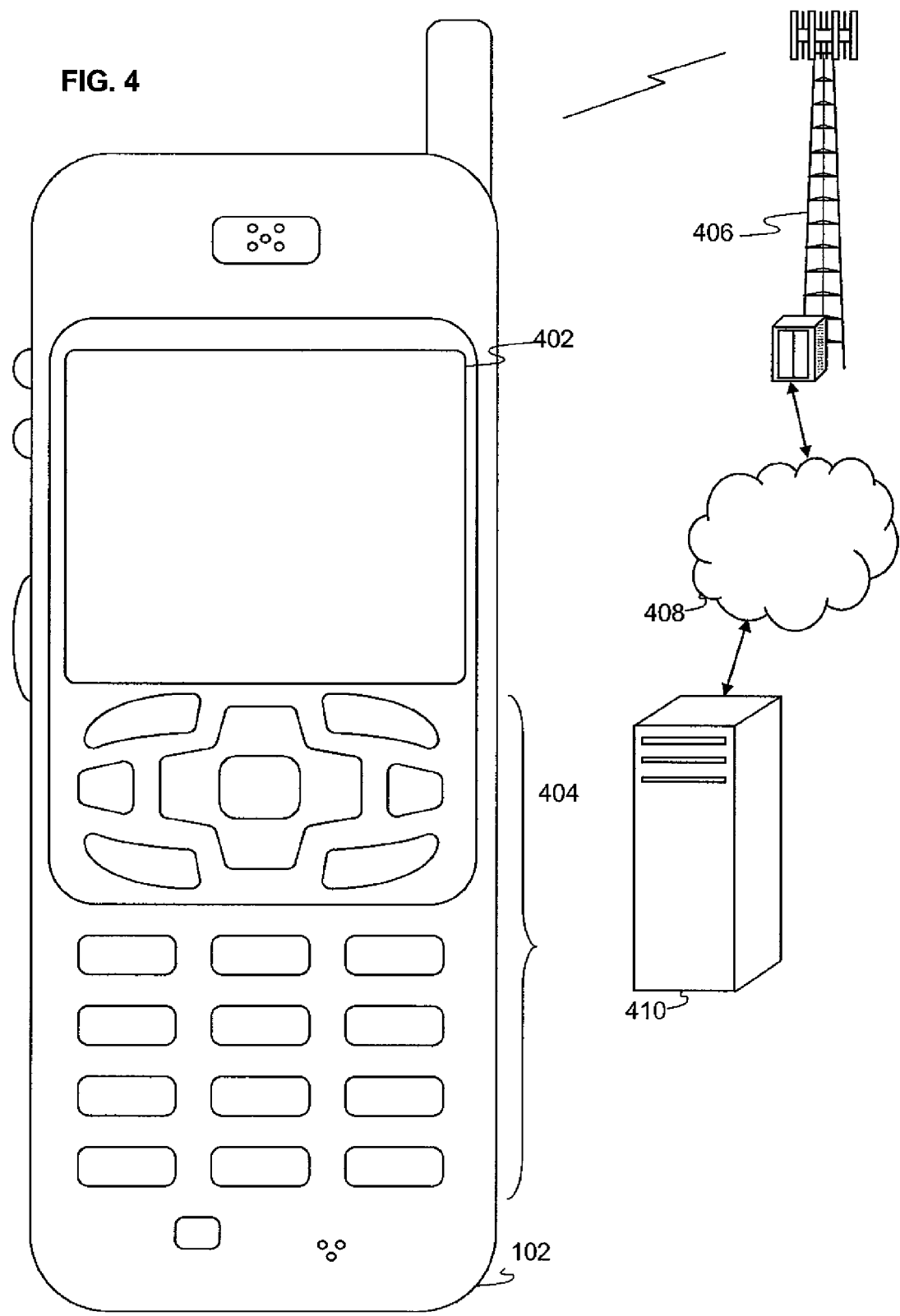
FIG. 4 illustrates an embodiment of a wireless communications system.

FIG. 4 shows a wireless communications system including the handset 102. FIG. 4 depicts the handset 102, which is operable for implementing aspects of the present disclosure, but the present disclosure should not be limited to these implementations. Though illustrated as a mobile phone, the handset 102 may take various forms including a wireless handset, a pager, a personal digital assistant (PDA), a portable computer, a tablet computer, or a laptop computer. Many suitable handsets combine some or all of these functions. In some embodiments of the present disclosure, the handset 102 is not a general-purpose computing device like a portable, laptop or tablet computer, but rather is a special-purpose communications device such as a mobile phone, wireless handset, pager, or PDA. The handset 102 may support specialized activities such as gaming, inventory control, job control, and/or task management functions, and so on.

The handset 102 includes a display 402 and a touch-sensitive surface or keys 404 for input by a user. The handset 102 may present options for the user to select, controls for the user to actuate, and/or cursors or other indicators for the user to direct. The handset 102 may further accept data entry from the user, including numbers to dial or various parameter values for configuring the operation of the handset. The handset 102 may further execute one or more software or firmware applications in response to user commands. These applications may configure the handset 102 to perform various customized functions in response to user interaction. Additionally, the handset 102 may be programmed and/or configured over-the-air, for example, from a wireless base station, a wireless access point, or a peer handset 102.

The handset 102 may execute a web browser application which enables the display 402 to show a web page. The web page may be obtained via wireless communications with a cell tower 406, a wireless network access node, a peer handset 102 or any other wireless communication network or system. The cell tower 406 (or wireless network access node) is coupled to a wired network 408, such as the Internet. Via the wireless link and the wired network, the handset 102 has access to information on various servers, such as a server 410. The server 410 may provide content that may be shown on the display 402. Alternately, the handset 102 may access the cell tower 406 through a peer handset 102 acting as an intermediary, in a relay type or hop type of connection.

FIG. 5 shows a block diagram of the handset 102. While a variety of known components of handsets 102 are depicted, in an embodiment, a subset of the listed components and/or additional components not listed may be included in the handset 102. The handset 102 includes a digital signal processor (DSP) 502 and a memory 504. As shown, the handset 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 102 to send and receive information from a cellular network or some other available wireless communications network or from a peer handset 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions, a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example, analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 102 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example, by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example, in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example, in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 102 to function as a peripheral device to exchange information with a personal computer or other computer system. The infrared port 524 and other optional ports such as a Bluetooth interface or an IEEE 802.11 compliant wireless interface may enable the handset 102 to communicate wirelessly with other nearby handsets and/or wireless base stations.

The input/output interface 518 may further connect the DSP 502 to the vibrator 526 that, when triggered, causes the handset 102 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the handset 102. Another input mechanism may be the touch screen LCD 530, which may also display text and/or graphics to the user. The touch screen LCD controller 532 couples the DSP 502 to the touch screen LCD 530.

The CCD camera 534 enables the handset 102 to take digital pictures. The DSP 502 communicates with the CCD camera 534 via the camera controller 536. The GPS sensor 538 is coupled to the DSP 502 to decode global positioning system signals, thereby enabling the handset 102 to determine its position. In another embodiment, a camera operating according to a technology other than charge-coupled device cameras may be employed. Various other peripherals may also be included to provide additional functions (e.g., radio and television reception).

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services (AMS) 606 that transfer control between applications running on the handset 102. Also shown in FIG. 6 are a web browser application 608, a media player application 610, Java applets 612, and an application interruption avoidance module 104. The web browser application 608 configures the handset 102 to operate as a web browser, allowing a user to enter information into forms and select links to retrieve and view web pages. The media player application 610 configures the handset 102 to retrieve and play audio or audiovisual media. The Java applets 612 configure the handset 102 to provide games, utilities, and other functionality.

Figure 7:
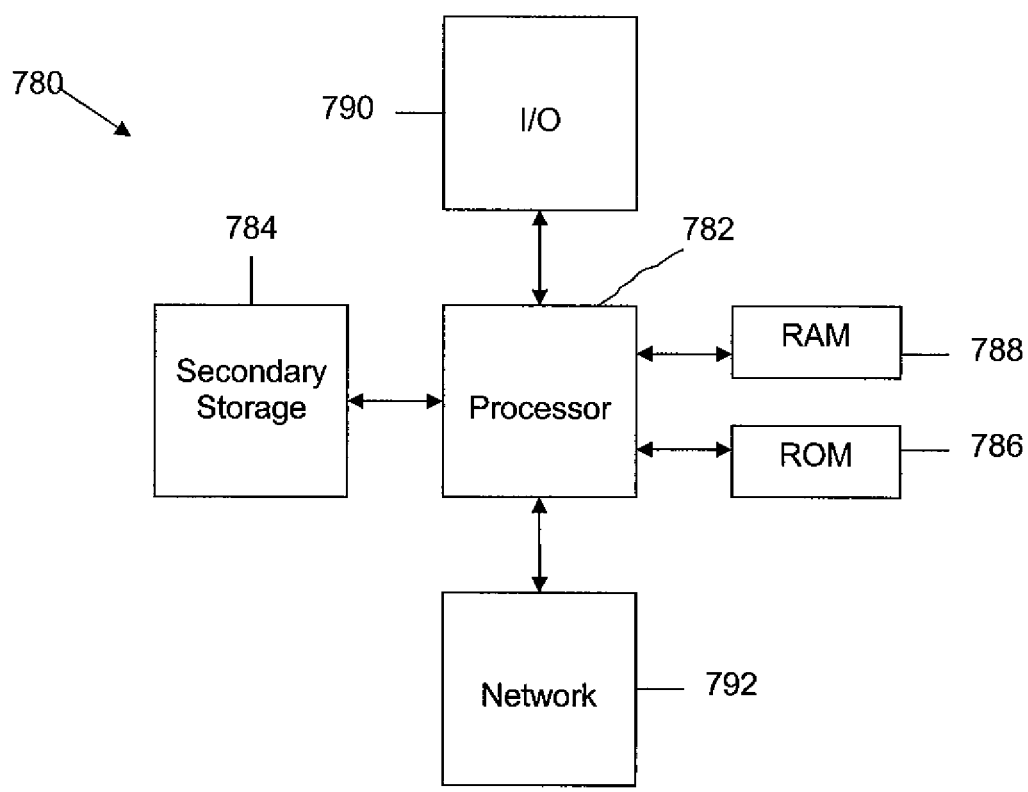
FIG. 7 illustrates an embodiment of an exemplary general-purpose computer system suitable for implementing the several embodiments of the disclosure.

FIG. 7 illustrates an exemplary general-purpose computer system suitable for implementing the several embodiments of the disclosure. The system described above may be implemented on any general-purpose computer with sufficient processing power, memory resources, and network throughput capability to handle the necessary workload placed upon it. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for avoiding handset application interruption, comprising:
    activating an application interruption avoidance service feature on a handset to prevent a voice call from interrupting an application;
    starting the application on the handset;
    receiving a message indicating that an incoming call is being forwarded by a coupled network element to voice mail, wherein the message is received from the coupled network element, and wherein the coupled network element is a mobile switching center (MSC); and
    presenting at least one indicator associated with the incoming call being forwarded to voice mail on the handset.

2. The method of claim 1, further comprising enabling and disabling presenting the incoming call indicators on the handset.

3. The method of claim 1, further comprising retrieving the incoming call from a voice mail server after the application terminates, wherein the application is one of an online game, an offline game, a scheduler, a contacts list, an address book, a data downloading, and a web page browsing.

4. The method of claim 1, wherein receiving the message from the coupled wireless network element comprises receiving a called party number in the message.

5. The method of claim 1, wherein activating the application interruption avoidance service feature on the handset comprises sending one of a second data call and a second voice call to the coupled wireless network element, wherein the wireless network element is configured to route the call to the voice mail server using an unconditional call forwarding service when the application interruption avoidance service is activated.

6. The method of claim 5, further including deactivating the application interruption avoidance service feature to allow a new voice call to come in, wherein deactivating the application interruption avoidance service feature comprises using one of the second data call and the second voice call to the coupled network element to deactivate the unconditional call forwarding to the voice mail server.

* * * * *